(12) United States Patent
Grigorian et al.

(10) Patent No.: US 7,794,840 B2
(45) Date of Patent: Sep. 14, 2010

(54) CAPACITORS COMPRISING ORGANIZED ASSEMBLIES OF CARBON AND NON-CARBON COMPOUNDS

(75) Inventors: Leonid Grigorian, Camarillo, CA (US); Steven G. Colbern, Fillmore, CA (US); Sean Imtiaz Brahim, Camarillo, CA (US)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 12/045,551

(22) Filed: Mar. 10, 2008

(65) Prior Publication Data

US 2009/0015984 A1  Jan. 15, 2009

Related U.S. Application Data

(60) Provisional application No. 60/918,129, filed on Mar. 15, 2007.

(51) Int. Cl.
*B32B 9/00* (2006.01)
(52) U.S. Cl. .................................. 428/408; 977/742
(58) Field of Classification Search .............. 428/408; 423/447.1, 447.3, 445 B; 977/742
See application file for complete search history.

(56) References Cited

U.S. PATENT DOCUMENTS

| | | | |
|---|---|---|---|
| 5,457,343 A * | 10/1995 | Ajayan et al. ............... 257/734 |
| 6,090,363 A * | 7/2000 | Green et al. ............. 423/447.1 |
| 6,205,016 B1 * | 3/2001 | Niu ........................... 361/503 |
| 6,454,816 B1 | 9/2002 | Lee et al. |
| 6,709,471 B2 | 3/2004 | Miyamoto |
| 6,842,328 B2 | 1/2005 | Schott et al. |
| 6,979,709 B2 | 12/2005 | Smalley et al. |
| 7,011,771 B2 * | 3/2006 | Gao et al. ................... 252/502 |
| 7,057,881 B2 | 6/2006 | Chow et al. |
| 7,189,476 B1 | 3/2007 | Macklin et al. |

(Continued)

FOREIGN PATENT DOCUMENTS

CN 1594212 A 3/2005

(Continued)

OTHER PUBLICATIONS

Kaempgen, M., et al., "Bifunctional carbon nanotube networks for supercapicitors," Applied Physics Letters 90, 264104 (2007).

(Continued)

*Primary Examiner*—David R Sample
*Assistant Examiner*—Daniel Miller
(74) *Attorney, Agent, or Firm*—Howrey LLP; Viola T. Kung

(57) ABSTRACT

This invention relates generally to capacitors comprising organized assemblies of carbon and non-carbon compounds. This invention further relates to methods of making such organized structures. It also relates to devices containing such structures. In preferred embodiments, the organized structures of the instant invention take the form of nanorods or their aggregate forms. More preferably, a nanorod is made up of a carbon nanotube filled, coated, or both filled and coated by a non-carbon material. In particular, the present invention is directed to a capacitor electrode comprising a carbon nanotube filled with one or more non-carbon materials comprising titanium, a titanium compound, manganese, a manganese compound, cobalt, nickel, palladium, platinum, bromine, iodine, an interhalogen compound, or the combination thereof.

29 Claims, 7 Drawing Sheets

U.S. PATENT DOCUMENTS

| | | | |
|---|---|---|---|
| 7,244,499 | B2 | 7/2007 | Sugiyama et al. |
| 2002/0076846 | A1 | 6/2002 | Ihm |
| 2003/0077515 | A1 | 4/2003 | Chen et al. |
| 2003/0089890 | A1 | 5/2003 | Niu et al. |
| 2003/0100189 | A1 | 5/2003 | Lee et al. |
| 2004/0241532 | A1 | 12/2004 | Kim |
| 2005/0042163 | A1* | 2/2005 | Allison et al. ............ 423/447.3 |
| 2006/0154071 | A1 | 7/2006 | Homma et al. |
| 2007/0095657 | A1 | 5/2007 | Kim et al. |
| 2007/0108068 | A1 | 5/2007 | Suh et al. |
| 2008/0048153 | A1 | 2/2008 | Naoi |

FOREIGN PATENT DOCUMENTS

| | | |
|---|---|---|
| JP | 2003-234254 | 8/2003 |
| JP | 2004-235618 | 8/2004 |
| JP | 2005-129566 | 5/2005 |
| JP | 2005-138204 | 6/2005 |
| JP | 2007-048907 | 2/2007 |
| KR | 20080002529 A | 1/2008 |
| WO | WO 02/088024 | 11/2002 |
| WO | WO 2005/069955 | 8/2005 |
| WO | WO 2007/015710 | 2/2007 |
| WO | WO 2007/130869 A2 | 11/2007 |

OTHER PUBLICATIONS

Nano World: Carbon Nanotube Capacitors, PhysOrg.com (Feb. 3, 2006), http://www.physorg.com/pdf10525.pdf.

Subramanian, V. et al., "Synthesis and Electrochemical Characterizations of Amorphous Manganese Oxide and Single Walled Carbon Nanotube Composites as Supercapacitor Electrode Materials," Electrocemistry Communications, vol. 8, pp. 827-832 (2006).

Wang, Xiao-feng et al, "Pseudo-capacitive behavior of cobalt hydroxide/carbon nanotubes composite prepared by cathodic deposition" Chinese Journal of Chemical Physics, 19(6), 499-505 (2006) (Abstract only).

Chen, Yong et al., "Growth of single-crystal α-$MnO_2$ Nanorods on multi-Walled Carbon Nanotubes," Materials Research Bulletin, vol. 42, pp. 1935-1941 (2007).

Fan, Zhen et al., "Preparation and Capacitive Properties of Cobalt-Nickel Oxides/Carbon Nanotube Composites," Electrochimica Acta, vol. 52, pp. 2959-2965 (2007).

Fan, Zhen et al., "Electrochemically Induced Deposition Method to Prepate γ-$MnO_2$/Multi-Walled Carbon Nanotube Composites as Electrode Material in Supercapacitors," Materials Research Bulletin (Sep. 15, 2007).

Hussein, Sharif et al., "Synthesis of Manganese Oxide/Carbon Nanotube Nanocomposites Using Wet Chemical Method," Journal of Materials Processing Technology, vol. 190, pp. 402-405 (2007).

Jayalakshmi, M. et al., "Hydrothermal Synthesis of $SnO_2$—$V_2O_5$ Mixed Oxide and electrochemical Screening of Carbon Nano-Tubes (CNT), $V_2O_5$, $V_2O_5$—CNT, and $SnO_2$—$V_2O_5$—CNT Electrodes for Supercapacitor Applications," Journal of Power Sources, vol. 166, pp. 578-583 (2007).

Lota, Grzegorz et al., "High Performance Supercapacitor From Chromium Oxide-Nanotubes Based Electrodes," Chemical Physics Letters, vol. 434, pp. 73-77 (2007).

Snow, E.S. et al., "Chemical Detection With a Single-Walled Carbon Nanotube Capacitor," Science, vol. 307, pp. 1942-1945 (2007).

Liang, Kyi; Chen, Ai; Li, Yue "Carbon nanotube/nickel oxide composite electrode materials for supercapacitors" Guisuanyan Xuebao, 30(4), 528-531 (2002).

Watts, P.C.P. et al., "Fe-Filled Carbon Nanotube-Polystyrene: RCL Composites," Chemical Physics Letters, vol. 366, pp. 42-50 (2002).

Park, Jong Hyeok et al., "Carbon Nanotube/$RuO_2$ Nanocomposite Electrodes for Supercpacitors," Journal of the Electrochemical Sociery, vol. 150(7), pp. A864-A867 (2003).

Wang, Xiao-Feng et al., "Carbon nanotube capacitor materials loaded with different amounts of ruthenium oxide" Wuli Huaxue Xuebao, 19(6), 509-513 (2003).

Deng, Meigen et al., "Enhanced performance of carbon nanotubes supercapacitors by activation and MnO2 deposition" Gongneng Cailiao / Journal of Functional Materials 36(3), 408-410 (2005).

Jang, J.E., "Nanoscale Capacitors Based on Metal-Insulator-Carbon Nanotube-Metal Structures," Applied Physics Letters, vol. 87, 263103 (2005).

Shah, S.R. et al., "Nanodevices That Explore the Synergies Between PDCs and Carbon Nanotubes," Journal of the European Ceramic Society, vol. 25, pp. 243-249 (2005).

Ye, Jian-Shan et al., "Preparation and Characteriation of Aligned Carbon Nanotube-Ruthenium Oxide Nanocomposites for Supercapacitors," Nanocomposite Materials, No. 5, pp. 560-565 (2005).

Zhang, Zhijing et al., "Carbon Nanotube Synthesis, Characteristics, and Microbattery Applications," Materials Science and Engineering B, vol. 116, pp. 363-368 (2005).

Fan, Zhen et al., "Preparation and Characterization of Manganese Oxide/CNT Composites as Supercapacitive Materials," Diamond & Related Materials, vol. 15, pp. 1478-1483 (2006).

Kuan-Xin, He et al., "Electrodeposition of Nickel and Cobalt Mixed Oxide/Carbon Nanotube Thin Films and Their Charge Storage Properties," Journal of Th Electrochemical Society, vol. 153(8), pp. A1568-A1574 (2006).

Lee, Jae-Kyung et al., "Electrochemical Capacitance of Nanocomposite Films Formed by Loading Carbon Nanotubes With Ruthenium Oxide," Journal of Power Sources, vol. 159, pp. 1527-1531 (2006).

International Search Report for PCT/US2008/056432, mailed Jan. 7, 2009.

Fagan, Solange B. et al., "Titanium monomers and wires adsorbed on carbon nanotubes: a first principles study", Nanotechnology, vol. 17, Feb. 2, 2006, pp. 1154-1159.

\* cited by examiner

US 7,794,840 B2

CAPACITORS COMPRISING ORGANIZED ASSEMBLIES OF CARBON AND NON-CARBON COMPOUNDS

This application claims priority to U.S. Provisional Patent Application No. 60/918,129 filed on Mar. 15, 2007; which is incorporated herein by reference.

TECHNICAL FIELD

This invention relates generally to capacitors and capacitor electrodes comprising organized assemblies of carbon and non-carbon compounds. In particular, the present invention is directed to a capacitor electrode comprising a carbon nanotube filled with one or more non-carbon materials comprising titanium, a titanium compound, manganese, a manganese compound, cobalt, nickel, palladium, platinum, bromine, iodine, an interhalogen compound, or the combination thereof.

BACKGROUND OF THE INVENTION

There are numerous potential applications of carbon nanotubes (CNTs) because of their unique mechanical, physical, electrical, chemical, and biological properties. For example, ultra low resistance conductors, semiconductors, highly efficient electron emitters, ultra-strong lightweight fibers for structural applications, lasers, and gas sensors can all be manufactured by using CNTs.

A variety of synthesis techniques for preparing CNTs exist. These techniques include for example carbon arc, laser ablation, chemical vapor deposition, high pressure carbon monoxide process (HiPco), cobalt-molybdenum catalyst process (CoMoCat). Depending on the preparation method, CNTs may be metallic and semiconducting.

The incorporation of non-carbon materials into CNTs may lead to even more diverse range of applications, for example, in improved gaseous storage media or electronic devices. In a publication entitled "Titanium-Decorated Carbon Nanotubes as a Potential High-Capacity Hydrogen Storage Medium", Physical Review Letters, 2005, Vol. 94, pages 175501-1 to 175501-4, Yildirim et al. describe that each titanium atom adsorbed on a single-wall CNT (SWCNT) may theoretically bind up to four hydrogen molecules.

In a publication entitled "Titanium Monomers and Wires Adsorbed on Carbon Nanotubes: A First Principles Study", Nanotechnology, 2006, Vol. 17, pages 1154-1159, Fagan et al. describe a theoretical study of Ti monomers and wires interacting with a semiconductor single-wall carbon nanotube, by inside as well as outside faces. Fagan et al. only provide a theoretical study without actual data.

Electrochemical supercapacitors based on high surface area carbon have been demonstrated since the late fifties. However, only in the nineties did supercapacitors become important, particularly for the development of fuel cell and hybrid electric vehicles. This is because a capacitor can discharge and recharge far faster than a battery, making it ideal both for generating bursts of speed and for soaking up the energy collected by regenerative braking of the vehicle. Capacitors may thus be able to bridge the gap that exists between speed and endurance.

Therefore, there exists a need for new or improved capacitors for providing high capacitance.

SUMMARY OF THE INVENTION

Figure 1:
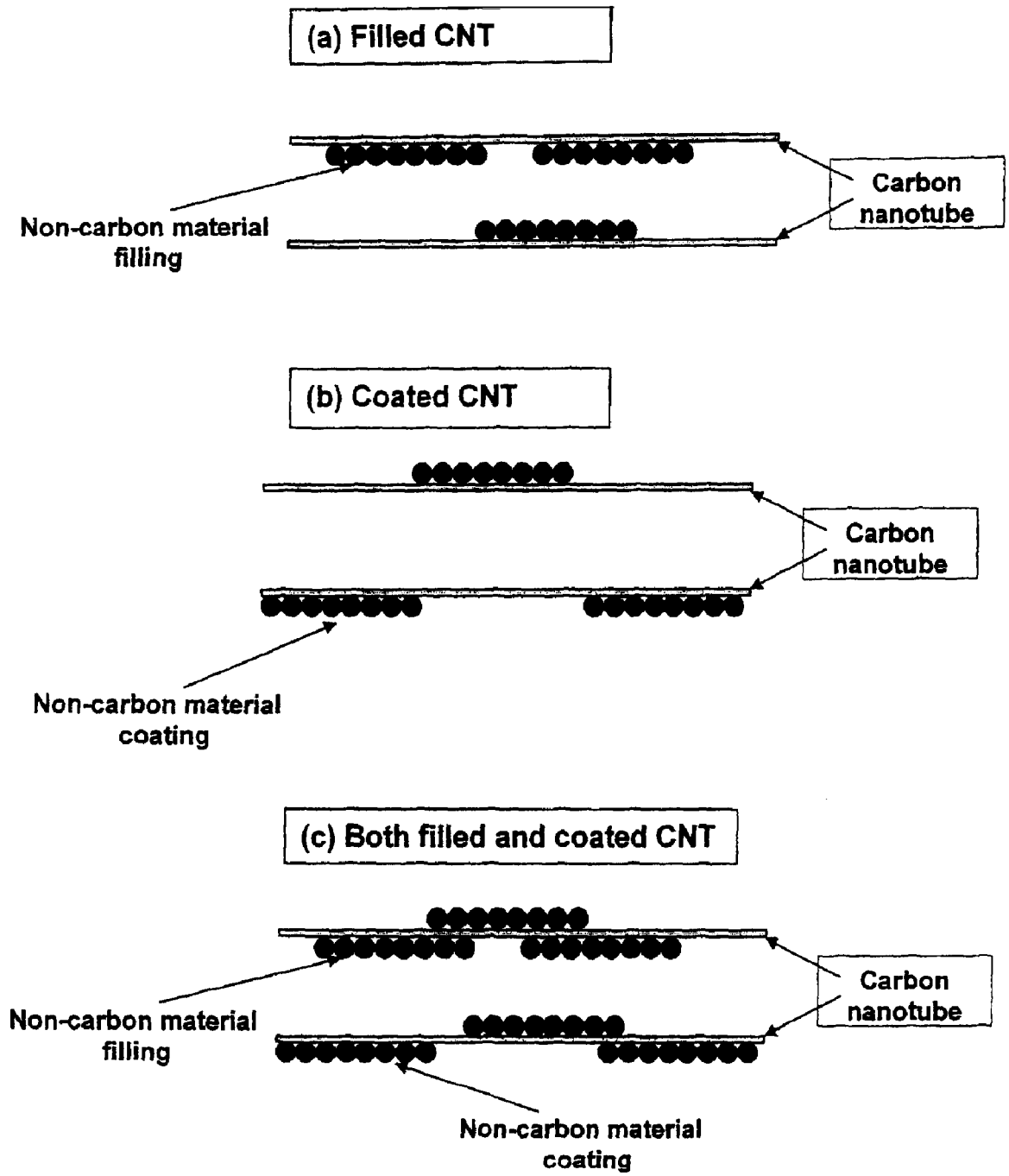
FIG. 1 is a schematic diagram of the types of the organized carbon and non-carbon assemblies of the instant invention.

The present invention is directed to a capacitor or a capacitor electrode comprising organized carbon and non-carbon assemblies. In particular, the present invention is directed to a capacitor electrode comprising a carbon nanotube filled with one or more non-carbon materials comprising titanium, a titanium compound, manganese, a manganese compound, cobalt, nickel, palladium, platinum, bromine, iodine, an interhalogen compound, or the combination thereof. A titanium compound may have a formula $TiH_wB_xN_yO_z$, wherein w=0 to 2, x=0 to 2, y=0 to 1, and z=0 to 2. The titanium compound may also be a mixture of titanium and bismuth. The manganese compound may have a formula $MnH_{w'}B_{x'}N_{y'}O_{z'}$, wherein w'=0 to 4, x'=0 to 2, y'=0 to 1, and z'=0 to 2.

In the capacitor electrode of the present invention, the carbon nanotube may be a single wall carbon nanotube or a multi wall carbon nanotube. Preferably, the capacitor electrode comprises at least one carbon nanotube.

In the capacitor electrode of the present invention, the filled carbon nanotube is optionally coated with a second non-carbon material. Preferably, the second non-carbon material comprises titanium, a titanium compound, manganese, a manganese compound, cobalt, nickel, palladium, platinum, or the combination thereof.

DETAILED DESCRIPTION OF THE INVENTION

This invention is directed to capacitors comprising organized assemblies of carbon and non-carbon materials. These organized structures are made up of one or more types of a repeating unit that is shorter in one dimension than the other dimensions and may adopt different shapes, such as a rod, spherical, semi-spherical, or egg shape. The shorter dimension is typically less than 1,000 nm, preferably less than 100 nm, or more preferably less than 10 nm. A cross-section of a repeating unit may resemble a circular, oval, or rectangular shape. Typically, individual repeating units (or different types of repeating units) aggregate to nanometer size fragments. In preferred embodiments, a repeating unit of this invention may be a nanorod comprising nano carbon and non-carbon materials.

Many forms of carbon are suitable for this invention. These forms of carbon include for example amorphous carbon, graphite, MWCNT, SWCNT, or a mixture thereof. In preferred embodiments of this invention, the carbon may be MWCNT, SWCNT, or a mixture thereof.

Many non-carbon materials are suitable for this invention. Non-carbon materials may be metal (or metal compounds) or non-metal. For example, a non-carbon material may comprise a metal, a metal compound, metal nitride, metal oxide, metal hydride, metal boride, bromine, iodine, interhalogen compounds, or mixture (or alloy) thereof. Some examples of a non-carbon material include magnesium (Mg), magnesium hydride ($MgH_2$), magnesium diboride ($MgB_2$), magnesium nitride ($Mg_3N_2$), magnesium oxide (MgO), strontium (Sr), scandium (Sc), scandium nitride (ScN), yttrium (Y), titanium (Ti), titanium hydride ($TiH_2$), titanium nitride (TiN), titanium diboride ($TiB_2$), titanium oxide ($TiO_2$), zirconium (Zr), zirconium diboride ($ZrB_2$), zirconium nitride (ZrN), hafnium (Hf), hafnium nitride (HfN), vanadium (V), vanadium diboride ($VB_2$), niobium (Nb), niobium diboride ($NbB_2$), niobium nitride (NbN), tantalum (Ta), chromium (Cr), chromium diboride ($CrB_2$), manganese (Mn), iron (Fe), cobalt (Co), nickel (Ni), palladium (Pd), platinum (Pt), boron (B), boron hydrides, boron nitride (BN), boron oxide ($B_2O_3$), bromine ($Br_2$), iodine ($I_2$), and a mixture (or alloy) thereof. In addition, the non-carbon material may be amorphous or crystalline. The crystalline form could be distorted, for example by having deficiencies in the crystal structure.

Particularly, the present invention is directed to a capacitor electrode comprising repeating units of a carbon nanotube filled with one or more non-carbon materials comprising titanium, a titanium compound, manganese, a manganese compound, cobalt, nickel, palladium, platinum, bromine, iodine, an interhalogen compound, or the combination thereof.

In one embodiment of this invention, the non-carbon material comprises titanium or a titanium compound. A titanium compound, as used herein, refers to a compound that contains titanium. For example, a titanium compound may be a titanium hydride, titanium boride, titanium nitride, titanium oxide, or a mixture thereof. In particular, a titanium compound may be abbreviated with a formula $TiH_wB_xN_yO_z$, where w varies in the range of 0 to 2, x varies in the range of 0 to 2, y varies in the range of 0 to 1, and z varies in the range of 0 to 2. The titanium compound may also be a mixture (or an alloy) of titanium with bismuth.

In another embodiment of this invention, the non-carbon material comprises manganese or a manganese compound. A manganese compound, as used herein, refers to a compound that contains manganese. For example, a manganese compound may be a manganese hydride, nitride, oxide, or a mixture thereof. In particular, a manganese compound may be abbreviated with a formula $MnH_{w'}B_{x'}N_{y'}O_{z'}$, where w' varies in the range of 0 to 4, x' varies in the range of 0 to 2, y' varies in the range of 0 to 1, and z' varies in the range of 0 to 2.

In yet another embodiment of this invention, the non-carbon material comprises bromine, iodine, an interhalogen compound, or mixtures thereof. An interhalogen compound, as used herein, is a compound that contains two or more halogens, such as IBr, $ICl_3$ and $BrF_3$.

The non-carbon material may also comprise limited amount of metal carbides, such as titanium carbide, silicon carbide, vanadium carbide, tantalum carbide, or a mixture thereof with an amount less than 10 volume percent.

As a repeating unit, the non-carbon material may fill, coat, or both fill and coat the carbon material. These three cases are schematically shown in FIG. 1 (a) to (c). In the first case shown in FIG. 1(a), the non-carbon material fills the core of the carbon. The articles of the first case are abbreviated hereafter as "non-carbon material filled carbon," for example, as Ti filled SWCNT. In the second case shown in FIG. 1(b), the non-carbon material coats the carbon. The articles of this case are hereafter abbreviated as "non-carbon material coated carbon," for example, as Ti coated SWCNT. In the third case shown in FIG. 1(c), the non-carbon material both fills and coats the carbon. The articles of this case are hereafter abbreviated as "non-carbon material filled and coated carbon," for example, as Ti filled and coated SWCNT.

The repeating unit may be partially hollow. For example, the core of a SWCNT may be partially empty. The empty portion of the core may be less than 95, 75, 50, 25, or 10 volume percent. The coating, filling, or coating and filling by the non-carbon material may have a continuous or non-continuous form. For example, they may be in the form of a continuous film deposited on the outer or inner surface of a SWCNT, islands deposited on the outer or inner surface of a SWCNT, beads deposited on the surface of a SWCNT, or particulates deposited in the core of a SWCNT.

The instant invention is also directed to a method for preparing the organized assembly of carbon and non-carbon materials.

The method comprises a step of reacting a carbon precursor with a halogenated precursor to generate a halogenated intermediate. A halogenated precursor may comprise a halogenated compound, such as magnesium iodide ($MgI_2$), scandium iodide ($ScI_3$), scandium bromide ($ScBr_3$), titanium iodide ($TiI_4$), titanium bromide ($TiBr_4$), vanadium iodide ($VI_3$), vanadium bromide ($VBr_3$), iron iodide ($FeI_2$), cobalt iodide ($CoI_2$), nickel iodide ($NiI_2$), palladium iodide ($PdI_2$), platinum iodide ($PtI_2$), boron iodide ($BI_3$), or a mixture thereof. The amount of the halogenated compound in a halogenated precursor may be at least 0.001 weight %, 0.01 weight %, 0.1 weight %, 1 weight %, 10 weight %, 50 weight %, or 80 weight %.

In another embodiment, a halogenated precursor suitable for this invention may comprise a halogen, such as iodine, bromine, an interhalogen compound (such as IBr, $ICl_3$, $BrF_3$), or a mixture thereof. The amount of halogen in a halogenated precursor may be at least 0.001 weight %, 0.01 weight %, 0.1 weight %, 1 weight %, 10 weight %, 50 weight %, or 80 weight %.

In addition to the above-described active ingredients, a halogenated precursor may also comprise inactive ingredients such as inert diluents, impurities, etc.

The halogenated intermediate may be used as obtained after the reaction of carbon precursor with a halogenated precursor to prepare the capacitor electrodes of the instant invention. As an optional step, the halogen is removed from the halogenated intermediate before the step of preparation of the capacitors. If the non-carbon includes a hydride, nitride, oxide, or a mixture thereof, the method may further comprises the step of hydrogenation, nitrogenation, and/or oxidation after the halogen removal step to obtain a composition comprising (1) carbon and (2) a non-carbon hydride, nitride, oxide, or a mixture thereof.

Many forms of the carbon precursor are suitable for this invention. These forms of carbon precursors include for example amorphous carbon, graphite, MWCNT, SWCNT, or a mixture thereof. In preferred embodiments of this invention, the carbon may be MWCNT, SWCNT, or a mixture thereof.

A SWCNT precursor suitable for this invention may be prepared by any synthesis method. Such methods may include, but are not limited to, carbon arc, laser vaporization, chemical vapor deposition (CVD), high pressure carbon monoxide process (HiPco), cobalt-molybdenum catalyst process (CoMoCat). A SWCNT precursor may be a mixture of SWCNT precursors prepared by more than one synthesis method.

In one embodiment, the SWCNT precursor is used as purchased for the method disclosed in this invention. In another embodiment, amorphous carbons and/or catalysts is removed from the as-purchased SWCNTs before the application of the disclosed method. The amorphous carbon and/or the catalyst removal may be complete or partial. Thus, a SWCNT precursor may contain any level of amorphous carbon and/or catalyst. The invention is not limited to any particular method of removing the amorphous carbon and/or the catalyst from the starting SWCNTs. As an example, the method disclosed by Delzeit et al. in U.S. Pat. No. 6,972,056 may be used for this removal.

As a first process step, a carbon precursor is reacted with a halogenated precursor. This reaction results in the incorporation of the carbon precursor with the halogenated precursor to form a halogenated intermediate. This incorporation may be in any form. For example, the halogen may be incorporated on the outer or inner surface or into the chemical structure of the carbon precursor. This incorporation may be through chemical or physical bonding.

The amount of non-carbon material present in the halogenated precursor controls the amount of non-carbon material incorporated into the assembly. Thus, by varying the ratio of the non-carbon material amount to the carbon precursor, the non-carbon material content of the final composition can be varied. The ratio of non-carbon material present in the halogenated precursor to carbon present in the carbon precursor may be at least 0.01 weight %, 1 weight %, 10 weight %, or 25 weight %.

The reaction between the carbon precursor and the halogenated precursor may occur at a temperature at which the halogenated precursor is a liquid. Typically, it is at or above the melting temperature of the halogenated precursor. For example, if the halogenated precursor is about 100 weight % $TiI_4$, the reaction may be carried out at a temperature above the melting point of $TiI_4$, which is about 150° C. When 100% $TiBr_4$ is a halogenated precursor, the reaction temperature may be above the melting point of $TiBr_4$, i.e., about 28° C. As another example, if the precursor is a mixture of a halogenated compound and a halogen, the reaction may be carried out at or above a temperature at which this mixture forms a liquid. For example, when a mixture of $TiI_4$ and $I_2$ is a halogenated precursor, the reaction may be carried out at a temperature above the melting point of iodine, i.e., about 113.6° C. Since bromine is liquid at room temperature, the reaction may be carried out at a temperature above 20° C. when a mixture of a halogenated compound and bromine is used as the halogenated precursor. In different embodiments, the carbon precursor and the halogenated precursor may be reacted at a temperature above 20° C., 100° C., 150° C., or 200° C. for a period longer than 1 minute, 10 minutes, or 20 minutes.

After reacting the carbon precursor with the halogenated precursor, a halogenated intermediate is produced. This halogenated intermediate may be used directly in preparation of the capacitors of the instant invention. For example, bromine filled SWCNTs may be used in preparation of such capacitors.

Optionally, the carbon precursor may be heated above room temperature to remove volatile compounds, such as water, before reacting with the halogenated precursor. The volatile compound removal may be achieved by heating the carbon precursor above 100° C. or 200° C. for a period longer than 10 minutes.

As another optional process step, halogen is removed from the halogenated intermediate. During the reaction between the carbon precursor and the halogenated precursor, the halogenated precursor may intercalate between layers of the carbon precursor, open the end caps of the carbon nanotubes and fill their cores, coat the carbon precursor, or both fill (i.e. intercalate) and coat the carbon precursor. As a result, the halogenated intermediate may contain halogen, in a free form, such as iodine, and/or in a form of a halogenated compound, such as $TiI_4$. It may be necessary to reduce the halogen level of the organized assembly to prepare a capacitor with desired properties. The halogen removal may be achieved by sublimation, evaporation, or thermal degradation. The halogen removal may also be achieved by reacting the halogenated intermediate with a suitable reactant, for example, hydrogen.

In particular, the halogen removal step may comprise heating the halogenated intermediate at a temperature for a period sufficient enough to reduce the halogen content of the intermediate below 10 weight %. For example, the halogen removal step may be carried out at a temperature above 200° C., 300° C., 500° C., or 800° C. for a period longer than 5 minutes, 10 minutes, 30 minutes, or 1 hour. In one embodiment, this heating may be carried out in a gas mixture comprising hydrogen at a temperature for a period sufficient enough to reduce the halogen content of the intermediate below 10 weight %. For example, the heating step may be carried out in a gas mixture comprising at least 0.01 volume % or 1 volume % hydrogen at a temperature above 200° C., 300° C., 500° C., or 800° C. for a period longer than 5 minutes, 10 minutes, 30 minutes, or 1 hour. The heating may be carried out below 1 atmosphere pressure.

After the halogenation removal step, an organized assembly comprising a carbon and a non-carbon material (such as metal, metal like compound, metal boride, bromine or a mixture thereof) is obtained. Specific examples of such non-carbon material include magnesium (Mg), magnesium diboride ($MgB_2$), strontium (Sr), scandium (Sc), yttrium (Y), titanium (Ti), titanium diboride ($TiB_2$), zirconium (Zr), zirconium diboride ($ZrB_2$), hafnium (Hf), hafnium nitride (HfN), vanadium (V), vanadium diboride ($VB_2$), niobium (Nb), niobium diboride ($NbB_2$), tantalum (Ta), chromium (Cr), chromium diboride ($CrB_2$), manganese (Mn), iron (Fe), cobalt (Co), nickel (Ni), palladium (Pd), platinum (Pt), boron (B), boron nitride (BN), bismuth (Bi), bromine, iodine, interhalogen compounds, and a mixture (or alloy) thereof.

For an organized assembly comprising (1) a carbon and (2) a non-carbon hydride, boride, nitride, oxide, or a mixture thereof, the method further includes hydrogenation, reaction with boron compounds, nitrogenation, and/or oxidation of the product after the halogen removal step. The hydrogenation may be carried out above room temperature in a gas mixture containing hydrogen, ammonia, or hydrazine. The reaction with boron compounds may be carried out by reacting the product with boron hydrides, for example $B_2H_6$, $B_5H_{11}$. The nitrogenation may be carried out above room temperature in a gas mixture containing nitrogen, ammonia, hydrazine, or a mixture thereof. The oxidation may be carried out at room temperature or above in a gas mixture containing oxygen. As a result of hydrogenation, reaction with boron compounds, nitrogenation, and/or oxidation, the assembly comprising (1) a carbon and (2) a non-carbon (such as metal) hydride, boride, nitride, oxide, or a mixture thereof is formed. Some examples of such non-carbon material include magnesium hydride ($MgH_2$), magnesium nitride ($Mg_3N_2$), magnesium oxide (MgO), scandium nitride (ScN), titanium hydride ($TiH_2$), titanium nitride (TiN), titanium oxide ($TiO_2$), zirconium nitride (ZrN), hafnium nitride (HfN), niobium nitride (NbN), boron hydrides, boron nitride (BN), boron oxide ($B_2O_3$), and a mixture thereof.

In one embodiment of this invention, the organized assembly comprising non-carbon material filled and coated carbon, such as Ti filled and coated SWCNT may be prepared by both filling and coating the carbon nanotube with the halogenated precursor. To achieve the filling, the size of the core should be larger than that of the halogenated precursor. For example, a halogenated compound, $TiI_4$ has a size of about 1 nm. During the halogenation reaction, this compound can fill the cores of SWCNTs that have inner diameters larger than 1 nm. For example, since the SWCNTs prepared by the carbon arc process have inner diameters larger than 1 nm, these SWCNTs may be both filled and coated with $TiI_4$. After the removal of iodine from the SWCNTs, Ti filled and coated SWCNTs are generated.

In another embodiment, the non-carbon material coated carbon, such as Ti coated SWCNTs may be prepared by coating the carbon nanotube with the halogenated precursor. To achieve the coating but not filling, the size of the core should be smaller than that of the halogenated precursor. For example, a halogenated compound $TiI_4$ has a size of about 1 nm and the SWCNTs prepared by CoMoCat process have inner diameters smaller than 1 nm. Therefore, during the halogenation reaction, $TiI_4$ coats but does not fill the cores of these SWCNTs. After the removal of iodine, Ti coated SWCNTs are produced.

In yet another embodiment, the non-carbon material filled carbon, such as Ti filled SWCNTs may be prepared by washing the halogenated precursor coated and filled carbon nanotubes with a suitable solvent, such as ethanol. This washing may remove the halogenated precursor coating, but not the filling at the carbon nanotube core. Then, after the iodine removal, Ti filled SWCNTs are produced. This washing may completely remove the halogenated precursor coating if a suitable solvent is used and/or if the solvent washing step is repeated several times. This washing may also partially remove the halogenated coating, for example, thereby incorporating a coating that has a particulate form to the carbon. The amount of the coating then may be varied by controlling the solvent type, solvent amount, and number of repetition of washing steps.

Thus, by choosing the core size of the carbon nanotube, or by incorporating a solvent wash step when the core size is larger than size of the halogenated precursor, the non-carbon materials may fill, coat, and both fill and coat the carbon nanotubes.

In one embodiment of the invention, the method comprises first filling the carbon nanotube and then further filling and/or coating the filled carbon nanotube with a second non-carbon material. The further filling and/or coating with the second non-carbon may be achieved by following the method disclosed above.

This invention is particularly directed to capacitors and capacitor electrodes comprising the organized carbon and non-carbon assemblies of the instant invention. The capacitor may be in any form suitable for storage of electrical charge. For example, the capacitor may comprise two electrodes of equal area arranged in parallel configuration and separated by a fixed distance, placed in a conducting electrolyte solution, with an insulating material or separator located between the two electrodes. There may be many more methods for construction of capacitors. All of them are within the scope of this invention.

In the present invention, at least one electrode of the capacitor comprises the organized carbon and non-carbon assemblies of the instant invention. In a preferred embodiment of this invention, the capacitor electrode comprises a carbon nanotube filled with one or more non-carbon materials comprising titanium, a titanium compound, manganese, a manganese compound, cobalt, nickel, palladium, platinum, bromine, iodine, an interhalogen compound, or the combination thereof.

In one embodiment, the non-carbon material comprises titanium.

In another embodiment, the non-carbon material comprises a titanium compound. The titanium compound may have a formula of $TiH_wB_xN_yO_z$, wherein w=0 to 2, x=0 to 2, y=0 to 1, and z=0 to 2. The titanium compound may also be a mixture of titanium and bismuth.

In another embodiment, the non-carbon material comprises manganese.

In a further embodiment, the non-carbon material comprises a manganese compound. The manganese compound may have a formula $MnH_{w'}B_{x'}N_{y'}O_{z'}$, wherein w=0 to 4, x=0 to 2, y=0 to 1, and z=0 to 2.

In a further embodiment, the non-carbon material comprises bromine, iodine, interhalogen compounds, or the combination thereof.

In the above-described capacitor electrode, the filled carbon nanotube is optionally coated with a second non-carbon material. Many non-carbon materials are suitable for coating. For example, the filled nanotubes may be coated with a non-carbon materials such as titanium, a titanium compound, manganese, a manganese compound, nickel, aluminum, tin, selenide, telluride, nickel oxide, cobalt oxide, manganese oxide, ruthenium oxide, osmium oxide, cobalt, nickel, palladium, platinum, or the combination thereof; with titanium, a titanium compound, manganese, a manganese compound, cobalt, nickel, palladium, platinum being preferred. The titanium compound may have a formula $TiH_wB_xN_yO_z$, wherein w=0 to 2, x=0 to 2, y=0 to 1, and z=0 to 2, or may be a mixture of titanium and bismuth. The manganese compound may have a formula $MnH_{w'}B_{x'}N_{y'}O_{z'}$, wherein w=0 to 4, x=0 to 2, y=0 to 1, and z=0 to 2.

Capacitance C is proportional to the surface area A of the capacitor electrode, the dielectric constant $\in$ of the electrodes, and inverse distance d between the electrodes:

$$C=k(\in A)/d$$

where k is a constant. In this equation, A is not simply the geometrical area, but it is the entire area of the capacitor material including the area provided by pores of the capacitor material. In other words, A is the total area that comes into close contact with the electrolyte.

Currently, there are two major approaches to achieve high capacitance. In the first approach, traditional capacitors are based on high $\in$ materials filling the space between the capacitor electrodes; however, these materials typically are heavy and have very low A (on the order of few m²/g), resulting in moderate values of capacitance per gram of material, Farad/gram (F/g). In the second recently introduced approach, capacitors use lightweight, electrically conducting, and extremely high surface area electrode materials (such as activated carbon, with A>1,000 m²/g) to achieve high F/g values; however, $\in$ values of these materials are low ($\in$<110) and do not contribute significantly to capacitance. The capacitors of the second approach are called supercapacitors.

The organized carbon and non-carbon assemblies of the instant invention are suitable for manufacturing of both types of capacitors. These organized assemblies of the present invention provide the unexpected advantages of high electrical conductivity, high $\in$ and high surface area. The area A of the organized assemblies is in the order of few hundreds or even thousands m²/g depending on the preparation method. The inventors have discovered that Ti filled SWCNT, $TiH_x$ filled SWCNT, Mn filled SWCNT, Bi—Ti filled SWCNT, Co filled SWCNT, Ni filled SWCNT, Pd filled SWCNT, Pt filled SWCNT, and Ti filled and coated SWCNT and Br filled SWCNT articles, but not Fe filled SWCNT article, provide higher capacitance, and are better capacitors than the starting SWCNT article.

The capacitor electrode of this invention may be prepared by many methods. In one embodiment of this invention, the electrode comprises a repeating unit of the organized carbon and non-carbon assembly. For example, the capacitor electrode comprises a Ti filled SWCNT. A single repeating unit of the organized assembly may also work as an electrode and thereby it is within the scope of this invention. For example, the capacitor may be one Ti filled SWCNT. The repeating unit may also be combined with other materials, for example with polymers, metals, or metal oxides in preparation of the electrode of this invention. A coating comprising the repeating unit of the organized assembly on a suitable substrate (for example, aluminum platelet) may also form the capacitor electrode.

The invention is illustrated further by the following examples that are not to be construed as limiting the invention in scope to the specific procedures or products described in them.

EXAMPLES

Example 1

Ti Filled SWCNT Articles

In this example, the single-wall carbon nanotubes (SWCNTS) were filled with titanium (Ti). This experiment was conducted with minimal exposure to the external environment. SWCNTs were purchased from Carbon Solutions Inc. (Riverside, Calif.) with a catalog number P2-SWNT. They were manufactured by using the arc process. These SWCNTs are designated as "starting SWCNT."

The starting SWCNTs were processed as follows. The SWCNTs, weighed about 1000 mg, were placed in a 50 ml three-necked round bottom Pyrex flask, which was equipped with a heating mantle, a thermocouple, and an addition arm. The flask was connected to a vacuum system through a liquid nitrogen trap.

The titanium iodide crystals ($TiI_4$) used in this Example were purchased from Aldrich with a catalog number 41,359-3. The iodine crystals ($I_2$) were purchased from Aldrich with a catalog number 20,777-2. $TiI_4$ (about 2.7 grams) was mixed with $I_2$ (about 2.7 grams) in a nitrogen-filled glove box and placed in the flask addition arm. The end of the addition arm was covered to protect the mixture from atmospheric moisture. The addition arm was then taken out of the glove box and connected to the reaction flask. Thus, the SWCNTs and the $TiI_4/I_2$ mixture initially were kept in separate locations in the flask.

After the connection, the flask was immediately evacuated to a pressure below 1 Torr. The contents of the flask were then heated to about 150° C. in vacuum for about 15 minutes to remove volatile species from the SWCNTs. After this heating, the vacuum valve was closed and the $TiI_4/I_2$ mixture was poured on the SWCNTs by tipping the addition arm. The heating was continued to melt the $TiI_4/I_2$ mixture and soak the SWCNTs in the melt as follows. First, after the mixture was poured, the flask was heated to about 200° C. within about 6 minutes. Then, it was further heated to about 275° C. within about $I_2$ minutes. Upon reaching about 275° C., the vacuum valve was opened to remove some un-reacted $TiI_4/I_2$ by evaporation into the cold trap. The heating was continued in vacuum at about 275° C. for about 1 hour. The contents of the flask were then cooled to the room temperature by cutting power to the heating mantle. At this step, the nanorods comprised $TiI_4/I_2$ coated and filled SWCNTs.

This article was processed to remove $TiI_4$ and $I_2$ coating by an ethanol washing step as follows.

After the cooling, the flask was transferred to the glove box kept in nitrogen, and the article was washed with ethanol (Aldrich, catalog number 45,984-4) to further remove unreacted $TiI_4/I_2$ mixture, as follows. The nanorods were first mixed with about 25 ml ethanol to prepare a suspension. This suspension was then centrifuged at a centrifugal force of about 10,000 g for about 15 minutes to obtain a supernatant phase and a precipitate phase. The supernatant phase was carefully removed by using a pipette and discarded. This washing step was repeated once. The precipitate phase was then transferred back to the glove box and it was dried at about 25° C. to remove residual ethanol. In the ethanol washing step, the centrifugation step may be replaced with a filtration step to recover the nanorods from the suspension. At this step, the nanorods comprised $TiI_4/I_2$ filled SWCNTs.

The $TiI_4/I_2$ filled SWCNTs were processed to remove iodine by a heat treatment step as follows.

The precipitate phase was then placed in a quartz tube, which was inserted in a tube furnace. The tube was sealed, connected to a vacuum system and evacuated to about 30 mTorr pressure. The furnace was then heated to about 500° C. within one hour. The heating was continued at about 500° C. for about 30 minutes.

After this heating period, a gas mixture consisting essentially of about 3% hydrogen and about 97% argon was introduced into the quartz tube and the pressure was raised to about 10 Torr. The heating was further continued at a furnace temperature of about 500° C. for about two hours at about 10 Torr in the flowing gas mixture, after which the furnace was cooled to room temperature. The Ti filled SWCNTs were thereby obtained.

Example 2

$TiH_x$ Filled SWCNT Articles

In this Example, $TiH_x$ filled SWCNTs were prepared. First, Ti filled SWCNTs were prepared in the same manner as described in Example 1, except that about 82 mg of SWCNT was used instead of about 1000 mg of SWCNT, about 1.8 grams of $TiI_4$ and about 1.8 grams of $I_2$ were used instead of about 2.7 grams of $TiI_4$ and about 2.7 grams of $I_2$. Then, these nanorods were placed in an air free chamber and heated to about 650° C. in vacuum for at least 2 hours to remove volatile compounds. After the removal of volatile compounds, the temperature was decreased to about 500° C. and the chamber was pressurized to about 500 Torr with hydrogen. The nanorods were hydrogenated by keeping them at this temperature for at least one hour. Finally, the hydrogenated nanorods were cooled to a room temperature. $TiH_x$ filled SWCNT articles were thereby prepared.

Example 3

Fe Filled SWCNT Articles

This Example was carried out in the same manner as described in Example 1, except that about 0.9 gram of ferric iodide and about 1.8 grams of iodine were used instead of about 2.7 grams of $TiI_4$ and about 2.7 grams of $I2$, that the annealing was carried out at about 500° C. for about 30 minutes, followed by about 600° C. for about 2 hours instead of about 500° C. for about 2 hours, and that during the cooling, a gas mixture consisting essentially of about 50 percent nitrogen, about 2.5 percent hydrogen and about 47.5 percent argon was flowed at a pressure of about 20 Torr, instead of the gas mixture consisting essentially of about 3 percent hydrogen and about 97 percent argon at a pressure of about 10 Torr. Fe filled SWCNT articles were thereby prepared.

Example 4

Metal Filled SWCNT Articles

This example was carried out in the same manner as described in Example 3, except that iodides of Mn, Co, Ni, Pd, or Pt were used instead of ferric iodide. The articles comprising Mn filled SWCNTs, Co filled SWCNTs, Ni filled SWCNTs, Pd filled SWCNTs, or Pt filled SWCNTs were thereby prepared.

Example 5

Bi and Ti Filled SWCNT Articles

In this Example, the Ti filled SWCNT article in Example 1 was further processed as follows. First, about 100 mg of this article was degassed at about 250° C. for about 30 minutes in vacuum. Then, about 1,000 mg of bismuth (Bi) powder were added to this article and the temperature was increased to about 500° C. and held there for about 18 hours. After this reaction, the material comprised black and gray granules. The black granules were mechanically separated from the gray granules and analyzed by SEM, EDX, and Raman spectroscopy. This analysis indicated that the article thereby prepared comprised Bi—Ti filled SWCNTs.

Example 6

Br Filled SWCNT Articles

In this Example, about 400 mg of the starting SWCNT were placed in a 50 ml capacity 3-neck flask, equipped with a vacuum pickup, two glass stoppers, and a heating mantle and the flask was immediately evacuated to a pressure below 1 Torr. The contents of the flask were then heated to about 150° C.-200° C. in vacuum for about 20 minutes to remove volatile species from the SWCNTs. After the removal of volatiles, the apparatus was cooled to a room temperature and filled with nitrogen. About 10 mL of bromine (99.5+%, Aldrich catalogue number 277576-450G) was then introduced into the flask through an addition funnel. The mixture was magnetically stirred while the temperature of the flask and contents was raised to a temperature in the range of 40° C. to 59° C. and kept at this temperature for about 2 hours. After this heating, the un-reacted bromine was distilled off at about 100° C. The un-reacted bromine was further removed by evacuating the flask and contents for about 5 minutes. The article comprising Br filled SWCNTs was thereby prepared.

Example 7

Ti Filled and Coated SWCNT Articles

In this example, the SWCNTs were both filled and coated with titanium (Ti). This example was carried out in the same manner as described in Example 1, except that the contents of the reaction flask were heated at about 275° C. for about 15 to 20 minutes prior to opening the vacuum valve and that the ethanol washing step was not carried out after the preparation of the article comprising $TiI_4/I_2$ coated and filled SWCNTs. Thus, after the cooling of the flask, $TiI_4/I_2$ coated and filled SWCNTs were directly placed in a quartz tube, which was inserted in a tube furnace. The Ti filled and coated SWCNTs were thereby obtained.

Example 8

Capacitance of Organized Assemblies

In this example, twelve electrodes were prepared to determine the capacitance properties of the organized assemblies. The first electrode was prepared by using the starting SWCNTs. The second electrode was prepared by using the Ti filled SWCNT articles prepared in Example 1, the third electrode by using the $TiH_x$ filled SWCNT articles prepared in Example 2, the forth electrode by using the Fe filled SWCNT articles prepared in Example 3, the fifth electrode by using the Mn filled SWCNT articles prepared in Example 4, the sixth electrode by using the Co filled SWCNT articles prepared in Example 4, the seventh electrode by using the Ni filled SWCNT articles prepared in Example 4, the eighth electrode by using the Pd filled SWCNT articles prepared in Example 4, the ninth electrode by using the Pt filled SWCNT articles prepared in Example 4, the tenth electrode by using the Bi—Ti filled SWCNT articles prepared in Example 5, eleventh electrode by using the Br filled SWCNT articles prepared in Example 6, and the twelfth electrode by using the Ti filled and coated SWCNT articles prepared in Example 7.

During the preparation of each electrode, the CNT articles were first suspended in anhydrous dimethylformamide (DMF), then sonicated using a horn sonicator (Sonics Materials, Model VC600) for about 15 minutes using three cycles of about 5 minutes duration (600 W, 20 MHz). The resulting dispersion was immediately deposited on the surface of polished aluminum (Al) plates drop by drop by using a pipette. This deposition formed a thin layer of dispersion on the plates. Each substrate was then heated in an oven at about 130° C. for about 30 minutes to remove the solvent. This heating formed a dry coating of the CNT article on the plate. This coating and the aluminum plate formed the electrode of the instant invention.

The electrochemical properties of each electrode thereby prepared were analyzed by cyclic voltammetry (CV) in the standard 3-electrode cell using an Ag/AgCl, 3 M Cl$^-$ reference electrode and a coiled Pt wire auxiliary electrode with a Princeton Applied Research VersaSTAT$^3$ Potentiostat/Galvanostat. The capacitor electrolyte was about 0.1 M tetraethylammonium tetrafluoroborate ($TEABF_4$) dissolved in propylene carbonate (PC). In this cell construction, the electrode of the invention formed the working electrode.

Figure 2:
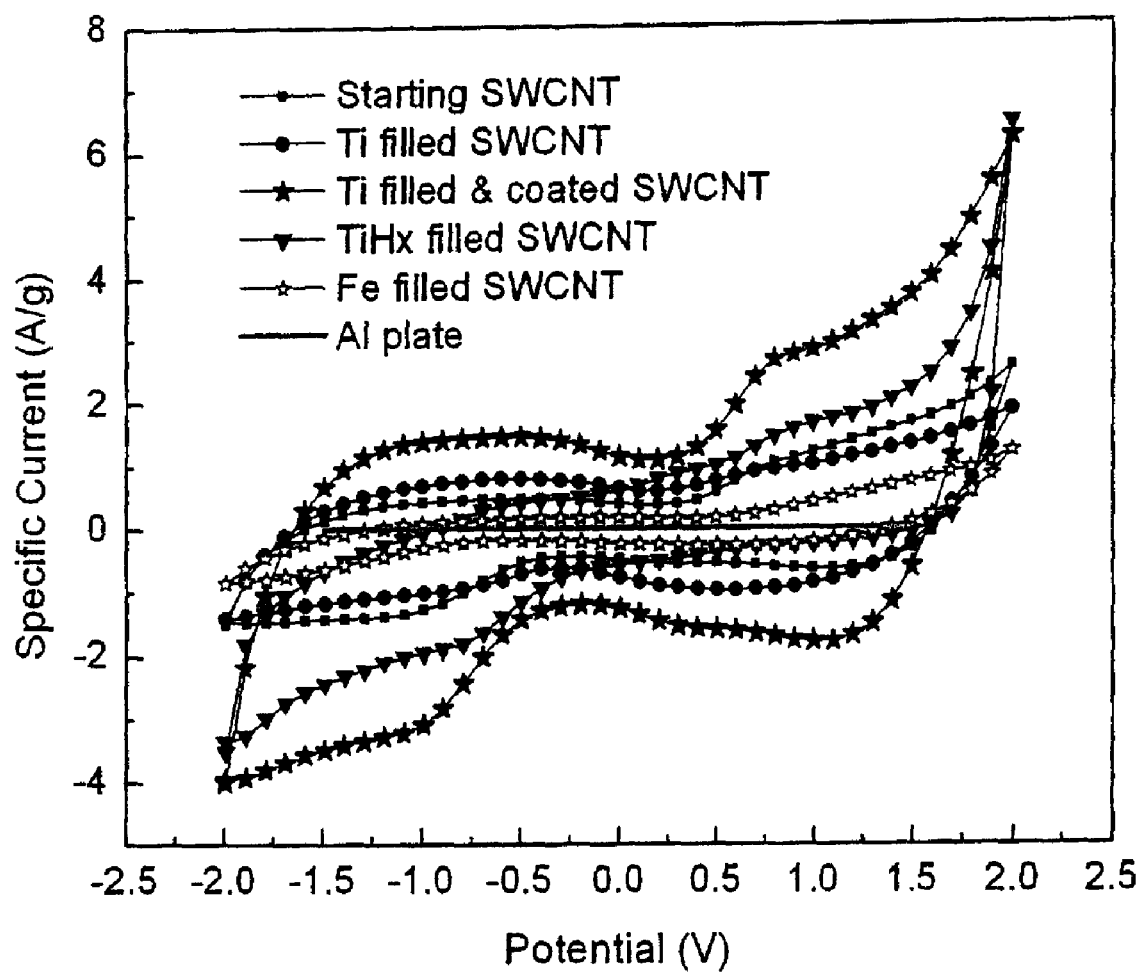
FIG. 2 shows variation of Specific Current of the organized carbon and non-carbon assemblies as a function of the applied potential.
Figure 3:
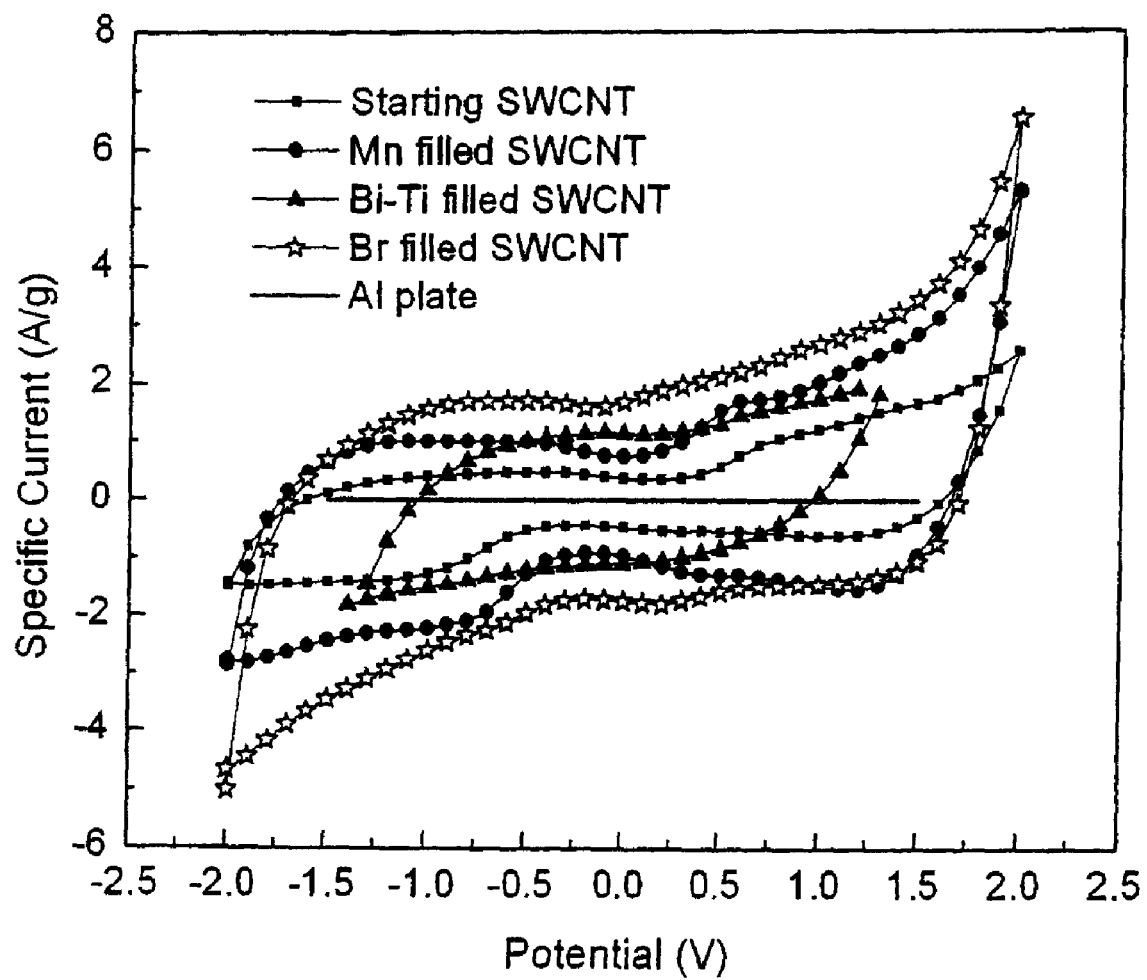
FIG. 3 shows variation of Specific Current of the organized carbon and non-carbon assemblies as a function of the applied potential.
Figure 4:
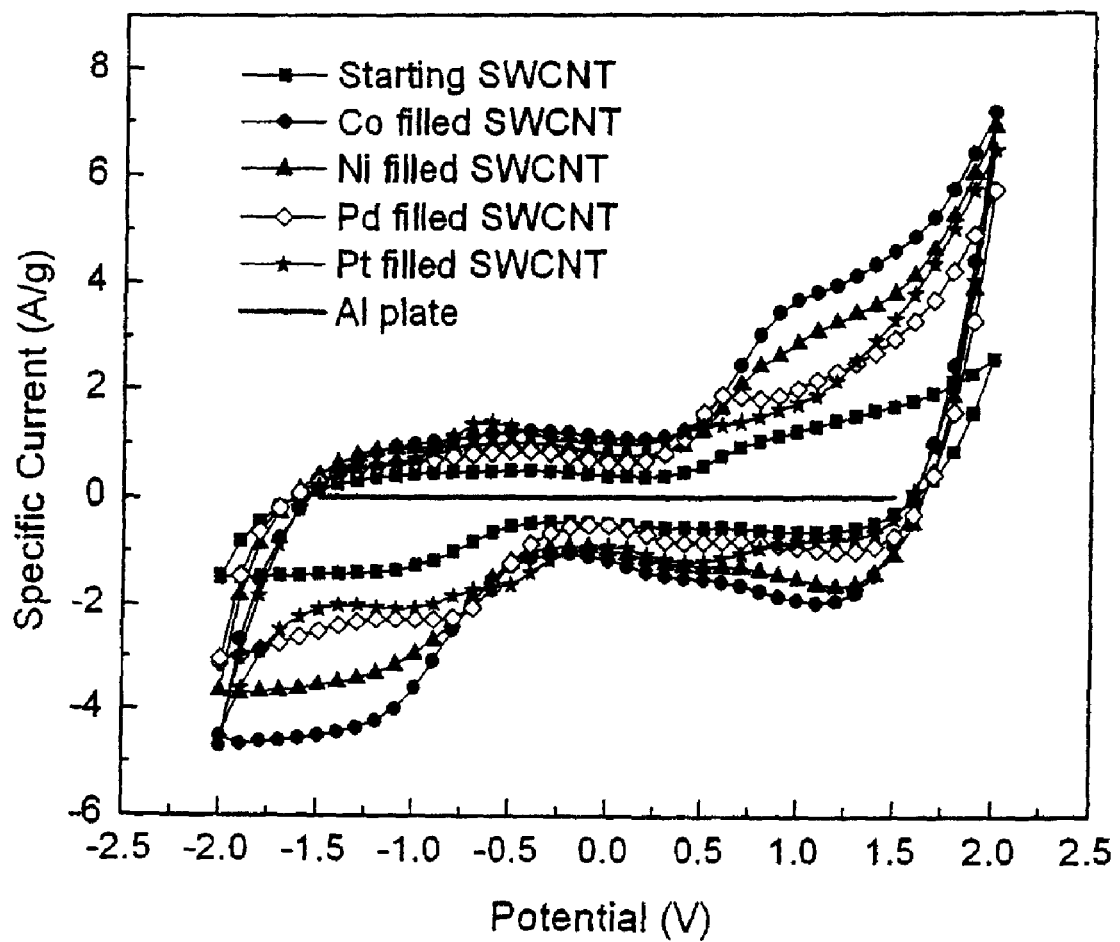
FIG. 4 shows variation of Specific Current of the organized carbon and non-carbon assemblies as a function of the applied potential.

Cyclic voltammograms of the CNT articles in the de-aerated $TEABF_4$/PC solution at about 300° Kelvin are shown in FIGS. 2 to 4. The rectangular-shaped profiles obtained at high scan rate (of about 0.05 Volts/second) are indicative of rapid charge and discharge processes at the interface between the nanotube electrodes and the electrolyte solution. From these cyclic voltammograms, the specific capacitance, C (F/g) of each electrode can be obtained using the quantitative equation:

$$C=i/v$$

where i is the net current (positive cycle−negative cycle) and v is the potential scan rate (0.05 Volts/second).

FIGS. 2 to 4 show the specific current profile of the aluminum plate with no CNT article (i.e. bare aluminum plate). For the aluminum plate electrode, the specific current showed negligible variation with the applied potential as compared to the electrodes comprising the organized assemblies. That is, it remained almost flat at about 0 Amperes/g, indicating that it did not have recognizable capacitance as compared to the electrodes of the instant invention.

Figure 5:
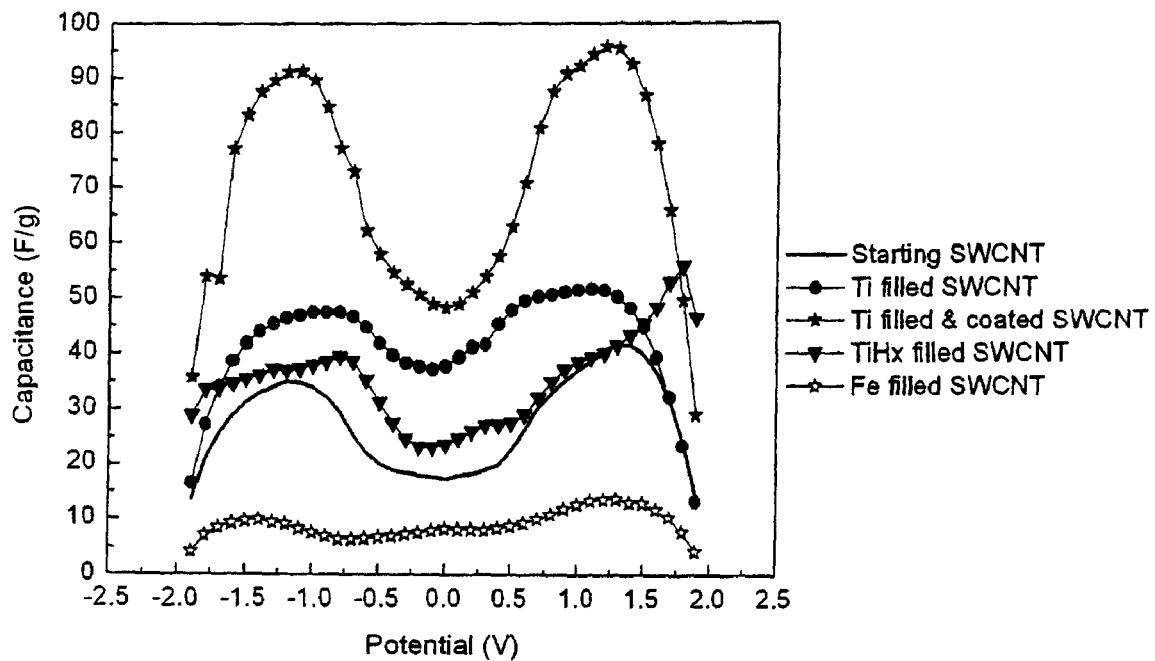
FIG. 5 shows variation of capacitance of the organized carbon and non-carbon assemblies as a function of the applied potential.
Figure 6:
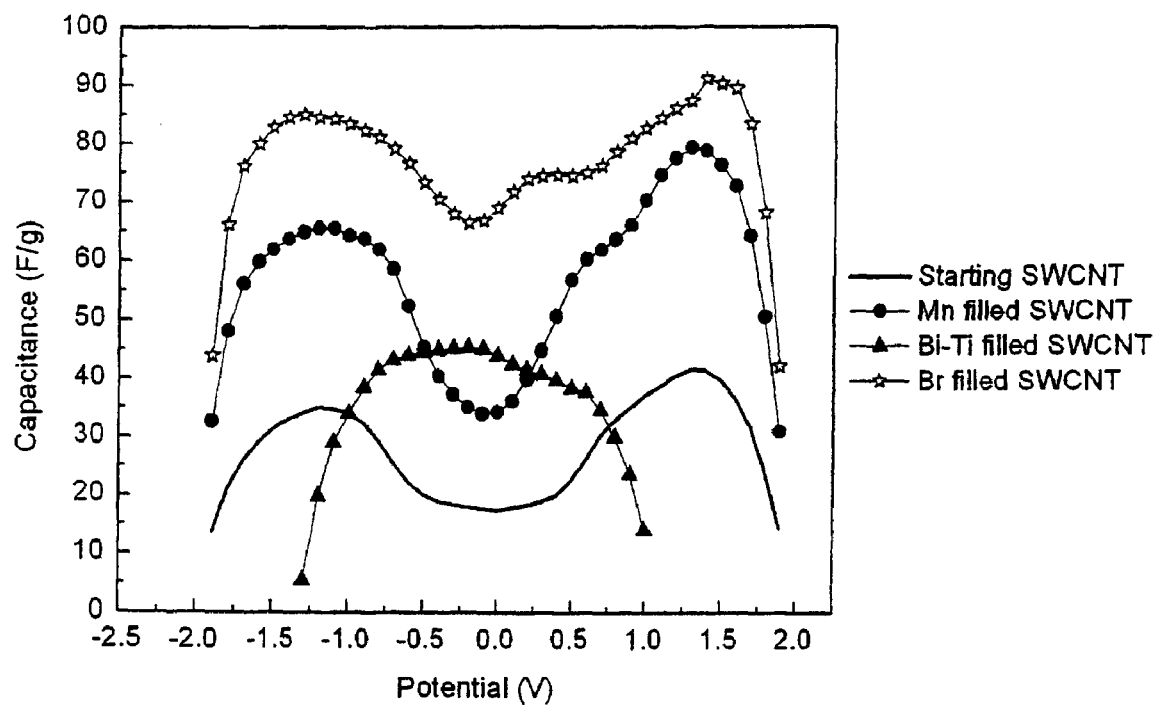
FIG. 6 shows variation of capacitance of the organized carbon and non-carbon assemblies as a function of the applied potential.
Figure 7:
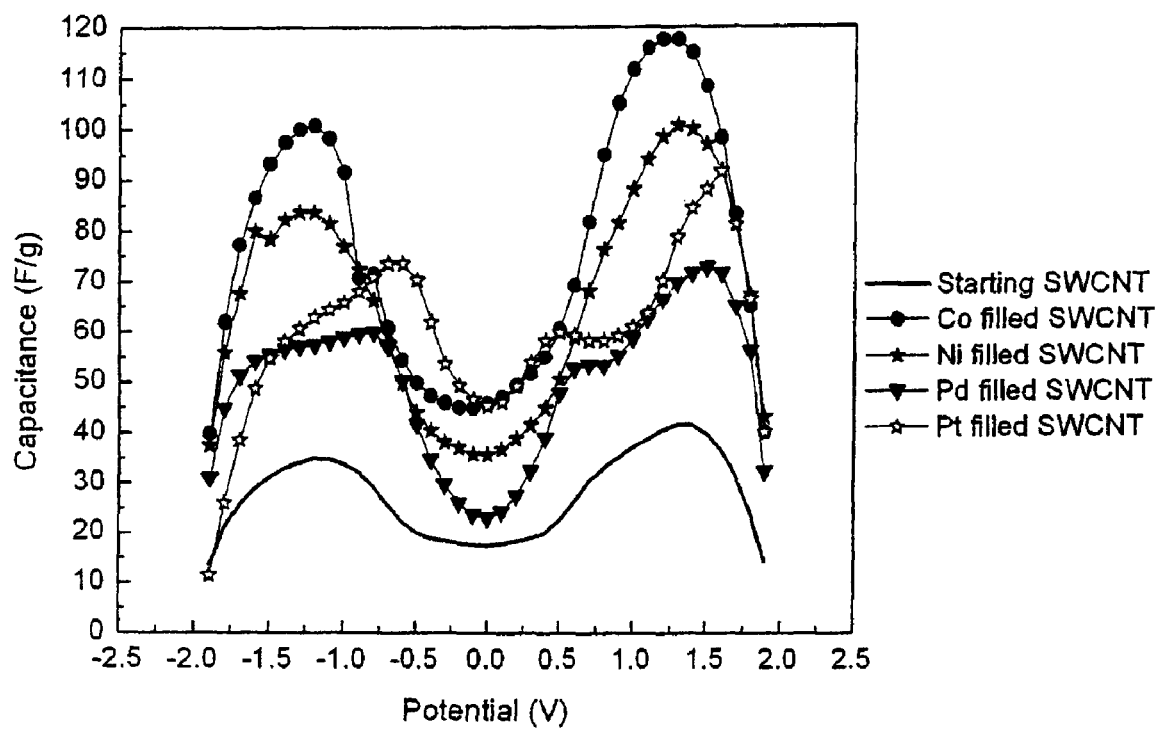
FIG. 7 shows variation of capacitance of the organized carbon and non-carbon assemblies as a function of the applied potential.

FIGS. 5 to 7 show the capacitance of the twelve electrodes measured at about 300° Kelvin as a function of the applied potential. All the electrodes comprising the organized assemblies had considerably much higher capacitances as compared to the bare aluminum plate. The filling of Ti, $TiH_x$, Mn, Bi—Ti, Co, Ni, Pd, Pt or Br; and filling and coating of Ti increased the capacitance above that of the electrode prepared by using the starting SWCNT article. At the potential of about 0 volts, the incorporation of Ti filling resulted in a capacitance gain of about 118%, incorporation of Ti filling and coating about 182%, incorporation of $TiH_x$ filling about 35%, incorporation of Mn filling about 100%, incorporation of Bi—Ti filling about 142%, incorporation of Br filling about 300%, incorporation of Co filling about 165%, incorporation of Ni filling about 105%, incorporation of Pd filling about 35%, and incorporation of Pt filling about 165%. This showed that Ti filled SWCNT, Ti filled and coated SWCNT, $TiH_x$ filled SWCNT, Mn filled SWCNT, Bi—Ti filled SWCNT, Br filled SWCNT, Co filled SWCNT, Ni filled SWCNT, Pd filled SWCNT, and Pt filled SWCNT articles are better capacitors than the starting SWCNT article.

However, at potential of about 0 volts, the Fe filled SWCNT decreased the capacitance below that of the electrode prepared by using the starting SWCNT article by about 60%. This showed that Fe is not a suitable non-carbon material for preparation of capacitors comprising the organized assemblies of the instant invention.

The surface area of several of these articles was measured by the Brunauer, Emmett and Teller method (BET). Nitrogen gas was used as the analysis gas and BET analysis was done in a P/Po range of 0.05 to 0.99. Table I summarizes the BET surface area, the Langmuir surface area and the micropore volume determined for these articles. As results indicated, the articles of the instant invention have large surface area, larger than a hundred meters square per gram.

TABLE 1

Surface Area of the Organized Assemblies.

| Article | BET Surface Area ($m^2/g$) | Langmuir Surface Area ($m^2/g$) | Micropore Volume ($cm^3/g$) |
|---|---|---|---|
| Starting SWCNT | 465.7 | 841.0 | 0.1015 |
| Ti filled SWCNT | 403.3 | 732.4 | 0.0835 |
| TiHx filled SWCNT | 272.3 | 519.6 | 0.0811 |
| Bi-Ti filled SWCNT | 365.4 | 670.2 | 0.0875 |

The invention, and the manner and process of making and using it, are now described in such full, clear, concise and exact terms as to enable any person skilled in the art to which it pertains, to make and use the same. It is to be understood that the foregoing describes preferred embodiments of the present invention and that modifications may be made therein without departing from the scope of the present invention as set forth in the claims. To particularly point out and distinctly claim the subject matter regarded as invention, the following claims conclude this specification.

What is claimed is:

1. A capacitor comprising two capacitor electrodes separated by an insulating material, at least one of the two capacitor electrodes comprising a carbon nanotube filled with a first non-carbon material comprising titanium, a titanium compound, manganese, a manganese compound, cobalt, nickel, palladium, platinum, bromine, iodine, an interhalogen compound, or any combination thereof, wherein said carbon nanotube is further coated with a second non-carbon material, wherein the filling of the first non-carbon material in the carbon nanotube increases the capacitance in comparison with the capacitance provided by a capacitor electrode comprising the same carbon nanotubes but unfilled.

2. The capacitor according to claim 1, wherein said first non-carbon material comprises titanium.

3. The capacitor according to claim 1, wherein said first non-carbon material comprises a titanium compound.

4. The capacitor according to claim 3, wherein said titanium compound has a formula $TiH_wB_xN_yO_z$, wherein w=0 to 2, x=0 to 2, y=0 to 1, and z=0 to 2.

5. The capacitor according to claim 3, wherein said titanium compound is a mixture of titanium and bismuth.

6. The capacitor according to claim 1, wherein said first non-carbon material comprises manganese.

7. The capacitor according to claim 1, wherein said first non-carbon material comprises a manganese compound.

8. The capacitor according to claim 7, wherein said manganese compound has a formula $MnH_wB_xN_yO_z$, wherein w=0 to 4, x=0 to 2, y=0 to 1, and z=0 to 2.

9. The capacitor according to claim 1, wherein said first non-carbon material comprises cobalt.

10. The capacitor according to claim 1, wherein said first non-carbon material comprises nickel.

11. The capacitor according to claim 1, wherein said first non-carbon material comprises palladium.

12. The capacitor according to claim 1, wherein said first non-carbon material comprises platinum.

13. The capacitor according to claim 1, wherein said first non-carbon material comprises bromine, iodine, interhalogen compounds, or the combination thereof.

14. The capacitor according to claim 13, wherein said non-carbon material comprises bromine.

15. The capacitor according to claim 13, wherein said non-carbon material comprises iodine.

16. The capacitor according to claim 13, wherein said non-carbon material comprises an interhalogen compound.

17. The capacitor according to claim 1, wherein said carbon nanotube is a single wall carbon nanotube.

18. The capacitor according to claim 1, wherein said carbon nanotube is a multi wall carbon nanotube.

19. The capacitor according to claim 1, wherein said second non-carbon material comprises titanium, a second titanium compound, manganese, a second manganese compound, cobalt, nickel, palladium, platinum, or any combination thereof.

20. The capacitor according to claim 19, wherein said second non-carbon material comprises a second titanium compound.

21. The capacitor according to claim 20, wherein said second titanium compound has a formula $TiH_{w'}B_{x'}N_{y'}O_{z'}$, wherein w'=0 to 2, x'=0 to 2, y'=0 to 1, and z'=0 to 2.

22. The capacitor according to claim 20, wherein said second titanium compound is a mixture of titanium and bismuth.

23. The capacitor according to claim 1, wherein said second non-carbon material comprises manganese.

24. The capacitor according to claim 1, wherein said second non-carbon material comprises a second manganese compound.

25. The capacitor according to claim 24, wherein said second manganese compound has a formula $MnH_{w'}B_{x'}N_{y'}O_{z'}$, wherein w'=0 to 4, x'=0 to 2, y'=0 to 1, and z'=0 to 2.

26. The capacitor according to claim 1, wherein said second non-carbon material comprises cobalt.

27. The capacitor according to claim 1, wherein said second non-carbon material comprises nickel.

28. The capacitor according to claim 1, wherein said non-carbon material comprises palladium.

29. The capacitor according to claim 1, wherein said non-carbon material comprises platinum.

* * * * *